United States Patent Office 3,177,699
Patented Apr. 13, 1965

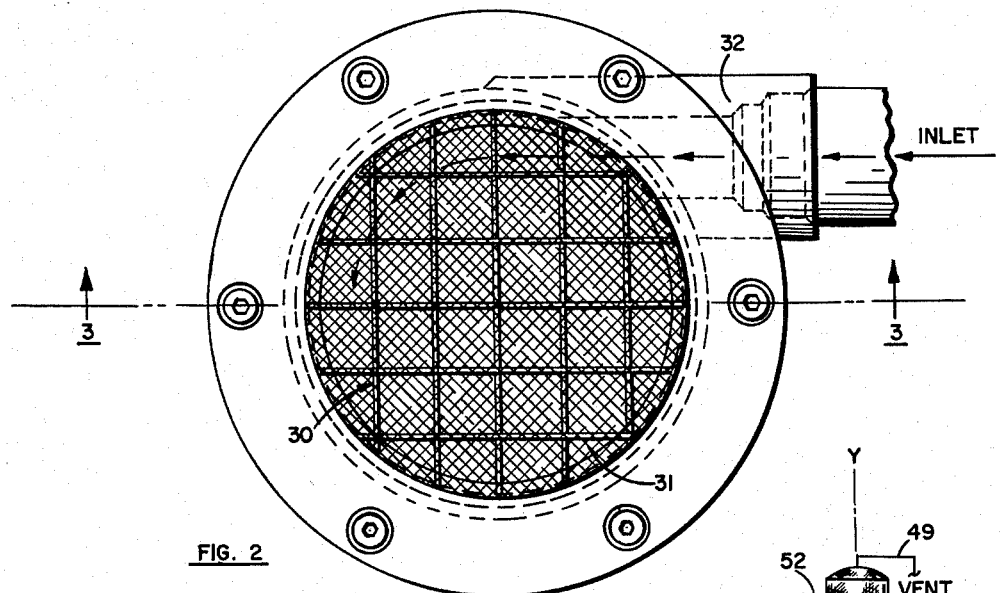
FIG. 2
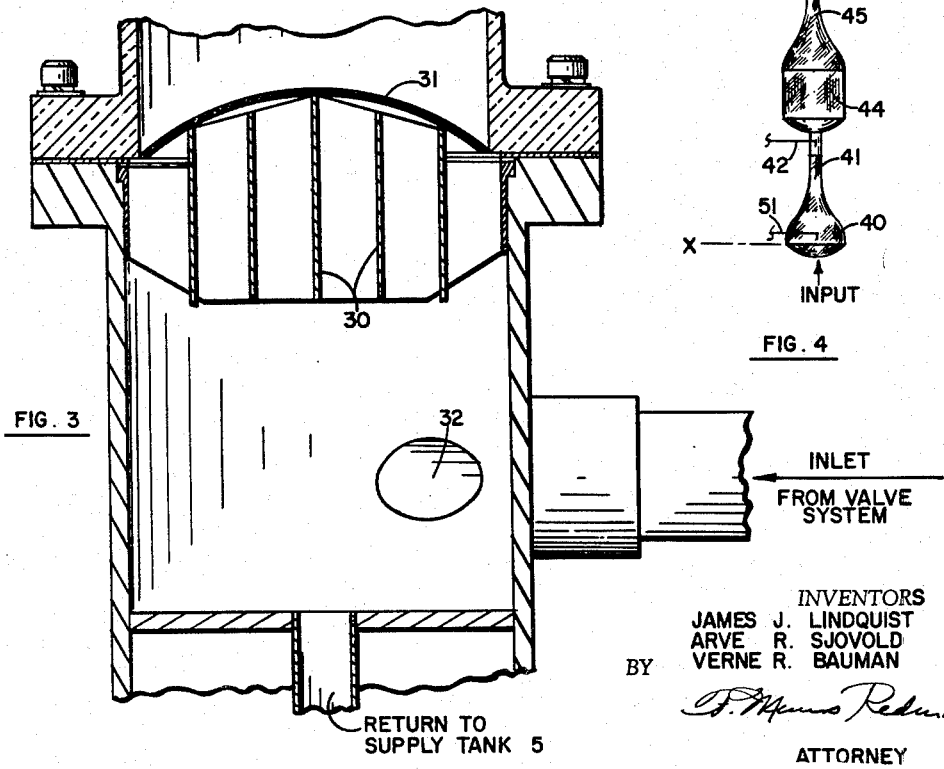
FIG. 3
FIG. 4
INVENTORS
JAMES J. LINDQUIST
ARVE R. SJOVOLD
VERNE R. BAUMAN
BY
ATTORNEY

3,177,699
VOLUMETRIC FLOW METER CALIBRATOR
James J. Lindquist, Northridge, Arve R. Sjovold, Simi, and Verne R. Bauman, Canoga Park, Calif., assignors to North American Aviation, Inc.
Filed Nov. 5, 1959, Ser. No. 851,053
10 Claims. (Cl. 73—3)

This invention relates to the measurement of liquid flow, and particularly to means for calibrating accurately a volumetric liquid flow meter.

This involves determinations applicable to a particular set of stream conditions, such as flow rate, viscosity, and density.

In operating high velocity vehicles, such as planes or missiles, it is very desirable to be able to measure accurately the amount of a liquid being fed to the engines for propulsive purposes. Such measurements are necessary in order to determine that rate at which fuel is being consumed, and in order to give an indication of the length of the flight path or time of flight to be anticipated on the basis of the quantity of fuel remaining to be yet consumed.

The problem of measurement is complicated by additional difficulties in those cases where liquid fuels are used which must be maintained at very low temperatures, such as liquid oxygen or liquid fluorine, due to the fact that these substances must be maintained in insulated, pressurized vessels.

In the broader field of liquid measurement generally, including water and hydrocarbons, two methods of calibrating volumetric flow meters have been widely used. One involves catching and weighing a quantity of liquid, and the other utilizes a volumetric measurement. Either type may be static or dynamic in operation, depending upon whether the liquid flowing through the test meter is directed into two paths—"return" or "catch"—or is accumulated directly as a dynamic measurement. Such systems have been limited in their precision to plus or minus 0.15 percent at best. The weight type of system is density-sensitive, and thus is subject to a wide range of errors where the temperature range is substantial. The weight measurement system is subject to dynamic error. With present volumetric systems, measuring the liquid level dynamically, or, alternatively, using a switching valve, involves serious potential errors in each case. The best of the volumetric systems do not reach quite the same order of precision as the best of the catch-and-weigh systems.

The overall accuracy of this system as a flow measuring device is determined by three things: (1) the basic precision of the system; (2) any inherent bias error caused by virtue of its operation; and (3) its calibration against a standard. This latter factor is not considered in the subsequent discussion since it is determined by the system calibration process and the excellence of the standard as distinguished from the performance of the flow bench in calibrating a particular flow meter. In evaluating the excellence of the flow bench as a flow measuring system, the basic precision is considered, and the lack of susceptibility to inherent bias error.

In the present invention a test bench is described in which a volumetric flow type of measurement is utilized which will provide precision of a substantially higher order of magnitude than has previously been available. By this system, precision of 0.03 percent has been regularly obtained, with improvements possible which result in a precision of 0.025 percent. This is substantially four or five times better than the best systems hitherto commercially available, and an alternative embodiment is presented herein which will provide precision ten times as great as the best of other current systems. Each calibration point is an indication of the flow of a known volume of liquid under a given set of stream conditions, that is, flow rate, viscosity, and density.

The present invention provides means for the measurement of dynamic flows through a flow meter for the purpose of calibration which will be effective over a wide range of pressures and flow rates of the flowing liquid, and which at the same time is relatively simple and easy to operate. The method involves the use of a completely enclosed system, so that prior difficulties in handling the liquid being measured, whether due to the pressures involved, which must be maintained, or to the nature of the material, which may cause noxious or harmful gaseous products to be permitted to escape during the process, are completely eliminated.

The method of the invention consists in forcing the material under a steady pressure, free from transient variations, through the meter to be calibrated at measurable rates into a retaining vessel adapted to measure the volume of the material collected therein with extreme precision. The system may be arranged to return the collected material to the input or temporary storage thereafter. By presetting the volume of flow permitted through the device being calibrated and maintaining a uniform driving pressure to insure that a desired flow rate is achieved, together with the use of suitable flow straighteners, a non-turbulent flow into the retaining vessel at a uniform rate may be obtained. The quantity of liquid collected in the retaining vessel is detected by sensitive probes connected electrically to a recording device to register accurately the length of time required for a given volume of liquid to pass through the meter, and the meter output corresponding to this interval. By repeating the measurement at a number of driving pressures and selected flow rates, the meter may be calibrated to produce precise indications as to the rate of flow under particular conditions of viscosity and density.

The objects of this invention thus include providing an improved flow meter calibration device for the determination of the rate of flow of liquids, gases, and the like.

Another object is the providing of flow rate calibration means adapted to use with extremely hot or cold liquids.

A further object is to provide means for calibrating flow meters and thereby deriving benefit from the excellence of this calibration even though the flow meters are subsequently disposed in inaccessible portions of equipment.

A still further object is to provide means for calibrating flow meters which may be operated by relatively unskilled personnel to obtain a highly precise result.

Yet another object is the providing for the calibration of flow meters indicative directly of volume of flow which may be operated rapidly to give results of high accuracy and repeatability.

A still further object is to provide means for calibrating flow meters which will be applicable to flow rates ranging from very slow to extremely rapid without a loss of accuracy.

Another object is to substantially increase the capacity of a calibrating system without a concomitant increase in the height of the collecting vessel.

A still further object is to eliminate flow pulsations and other transients normally inherent in pump-driven systems.

Yet another object is to eliminate measurement inaccuracies due to the effect of "slosh" in transition sections.

A further object is to provide a shape of vessel minimizing the inequalities in surface level due to "slosh."

These and other objects of this invention will become apparent from the following specifications when taken with the accompanying drawings in which:

FIG. 2 is a figure showing details of the flow-straightening arrangement;

FIG. 3 is a view showing details of the standpipe arrangement used with this equipment; and FIG. 4 is a schematic view of an alternative arrangement of the standpipe.

Figure 1:
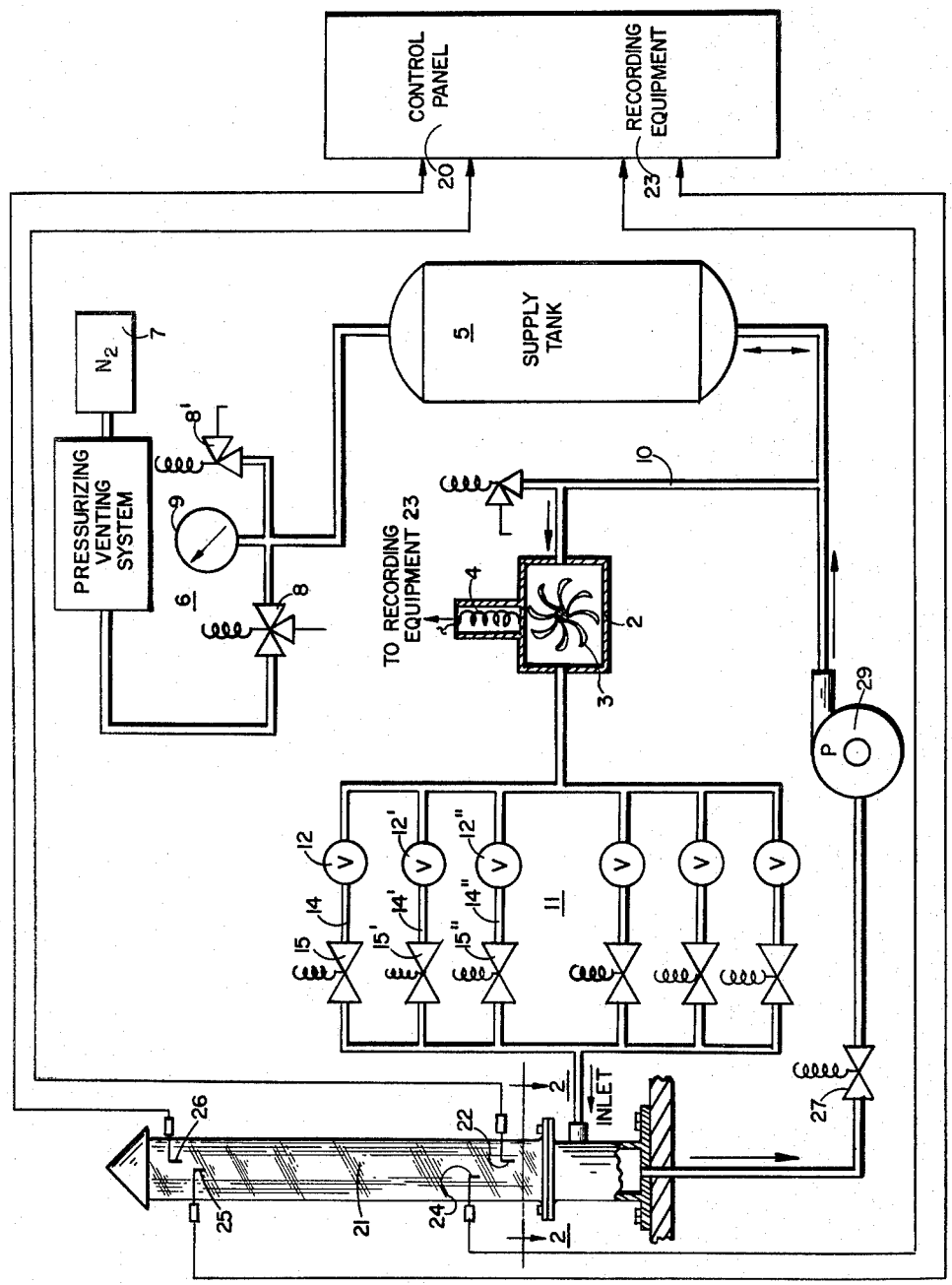
FIG. 1 is a schematic flow diagram of the arrangement of the invention for calibrating a flow meter.

The equipment as illustrated in the drawings provides a direct volume measurement with steady flow, eliminating pulses. The operation, once started, is automatic, so that no operator error need be introduced. This rapid operation may be accomplished with very high accuracy and repeatability by even relatively unskilled personnel.

Referring now to FIG. 1, the calibrating system is shown as it is arranged for precisely determining the characteristics of a flow meter 2. The flow meter 2 may be of conventional design, and is represented schematically as having an impeller 3 of a material having high magnetic permeability, and an electromagnetic pickup coil 4 arranged to have currents generated therein by rotation of impeller 3. Pressure for driving the particular liquid through the meter to be calibrated is supplied from a local pressure tank 5, in turn maintained at a constant pressure by the pressurizing-venting system indicated generally at 6. The pressurizing-venting system 6 may include a high pressure nitrogen supply 7 and suitable valves and meters which form no part of the present invention but supply pressure to the tank 5 under the immediate control of the solenoid valve 8, with the pressure indicated on metering means 9. This system 6 is conventionally arranged, by means shown schematically as a relief valve 8′, to permit venting the calibrating system 1 under pressure. The local supply tank 5 delivers the particular substance for which the flow meter 2 is to be calibrated through the input line 10, the volume rate of flow being precisely controlled by a valve system indicated schematically as 11. The valve system 11 consists of a plurality of manual shutoff valves 12, 12′, 12″, etc., which may be individually adjusted to control the flow through a plurality of branches 14, 14′, 14″. The adjusted nominal volume is permitted to flow through each of these individual branches by the solenoid control valves 15, 15′, 15″, etc., which act in response to values preset in the operating panel 20 to nominal flow rates. The preselected flow volume then passes tangentially into the standpipe 21, which may be conveniently a vertical tube of Lucite or other transparent material so that the operator may observe the flow of the liquid thereinto.

The liquid, which is normally electrically conducting and acts as part of the circuit to the recorder, is permitted to rise in the standpipe to a point where it makes contact with a first probe 22 electrically connected to the control panel 20. The probe 22, and other probes 24, 25, 26, to be described hereafter, may consist simply of a conductor portion leading into the standpipe from the side, and bent to present its end normal to the liquid surface near the central axis of the pipe 21. This insures that the recording will begin and end at points between which the volume may be accurately measured. In the event that an electrically non-conducting substance were being measured, a suitable and obvious modification in the probe structure might be made to close the electrical circuit to the recorder. As soon as the liquid makes contact with the probe 22, the recording equipment 23 in the panel is energized, but the flow is permitted to become uniform, and it will not begin recording the measured flow until the liquid level rises further to engage the probe 24. Probe 24 is connected to actuate means in the recording equipment 23 to make a permanent record of flow meter output and elapsed time. As the flow continues, the recording equipment will indicate on suitable means, such as an electronic counter, digital counting means, a paper tape or magnetic tape, the increasing value of the flow meter output and time until the rising liquid comes in contact with a top measuring probe 25, at which point the recorder is signaled that the predetermined volume has been passed into the standpipe, and to record the time required for this quantity to flow. Flow will continue, however, until the liquid level reaches the top cutoff probe 26. At this point the control panel 20 will be signaled to immediately shut off the input flow of liquid, and to print out the elapsed time and accumulated output on means such as a paper tape. Thereafter, a conventional relay sequence, not shown in detail, will be actuated to vent through valve means 8′, the pressurized tank 5, open the return valve 27, and operate the return pump 29 to deliver the liquid from the standpipe 21 back to the local liquid supply tank 5.

It will be understood that a suitable set of baffles 30 and screening 31 may be installed in the lower end of the standpipe 21, as seen in FIGS. 2 and 3 in detail. These elements are thus "upstream" from the various probes. These may cooperate with a tangential inlet at 32 from the valve system 11 to straighten out the flow and eliminate undesirable turbulence in the liquid entering the standpipe prior to engaging the recording probes 24 and 25. It will also be noted that inaccuracies due to turbulence at the finish of the filling of the standpipe are eliminated by continuing the flow at a uniform rate past the upper recording probe 25 and until it reaches the cutoff probe 26. The relatively large volume of liquid in the standpipe is of assistance in providing damping of small variations in the flow rate.

While the volume of liquid contained in the standpipe may be known with great accuracy by preliminary measurements, it is possible to increase the accuracy of measurements still further by the alternative standpipe arrangement shown in FIG. 4.

In FIG. 4 is shown an entrance section having an expanded diameter at 40 succeeded by a smoothly necked-down or constricted portion 41 at which the first recording probe 42 is placed. This constricted point is succeeded by a second expanded portion 44 which in turn is again followed by a second constricted portion 45, beyond which is inserted the second recording probe 46. Beyond recording probe 46 the liquid is permitted to expand again in a portion 47 of increased diameter prior to its return to the system. A vent 49 may be provided to permit expelling noxious gases from the increased diameter portion 47. An initial energizing probe 51 and a cutoff probe 52 may be provided to accomplish the same functions as probes 22 and 26 in FIG. 1.

It will be seen that the constricted portions 41 and 45 enable a more accurate measure to be made of the liquid volume contained between the lower recording probe 42, and the upper recording probe 46, in that the reduced diameter portions at which the probes engage the liquid minimize variations due to surface inequalities, or "slosh." This is particularly advantageous with liquids of reduced viscosity, such as liquid oxygen.

This configuration permits adding substantially to the volumetric capacity of the system without requiring a concomitant increase in height, such as would be necessary with the standpipe shown in the embodiment of FIG. 1.

The geometry of the constricted portion may be described by a particular mathematical function so as to minimize distortion of the free surface due to "slosh," or surface irregularities due to the dynamics of fluid passage. It has been found that if the constricted portion, which is a surface of revolution about the Y axis in the direction of flow, has its radial dimensions and volume related in accordance with the equation below, slosh-free flow will result:

$$y = -\frac{Ct_0}{\pi^2(b^2-a^2)}\left[\frac{\sqrt{a^2-(x-b)^2}}{x}+\frac{b}{\sqrt{b^2-a^2}}\arcsin\left(\frac{bx+a^2-b^2}{ax}\right)\right]+\frac{Ct_0 b}{\pi(b^2-a^2)^{3/2}}$$

where $y$ = dimension along the axis of flow (in.);
$x$ = the radius of the constricted portion at any position $y$ along its length (in.);
$Ct_0$ = the volume of the constricted portion of the vessel (gal.);
$C$ = flow rate (gal./sec.);
$t_0$ = time (sec.);
$b+a$ = the radius of the vessel at the entrance to the constricted portion (in.); and
$b-a$ = the radius of the vessel at the exit of the constriction (in.).

FIG. 4 also more particularly discloses the above set forth theoretical relationships as they would appear with reference to any particular portion of the standpipe arrangement. Since the above stated equation can obviously be readily used in an identical manner in order to calculate any particular radial dimension-volume relationship at any particular portion of the standpipe, such relationships are only discussed in reference to the lower portions 40 and 41 thereof. As theoretically shown and as hereinbefore stated, the standpipe is constructed and arranged to have the surfaces of revolution thereof formed about the Y axis, in the direction of flow. The radial dimensions thereof may then be conveniently referenced in the direction of the X axis, in the conventional manner.

The essential design parameters set forth above, which are utilized in the above stated equation, are also shown in their theoretical referenced position relative to the standpipe. It should be noted that the entrance and exit points on the theoretically calculated standpipe portion have been illustrated as located at the extremities of the portions of the respective entrance section 40 and the necked-down portion 41 in order to more readily facilitate the necessary theoretical calculations. However, it should be obvious that such points may be arbitrarily located at any desired location on the standpipe depending on the particular work assignment, i.e., the specific location of such points depends on whereat it is desired to compute the radial dimension-volume relationship.

From the above description, it will be seen that we have invented apparatus and a method for significantly improving the accuracy with which flow meters may be calibrated.

Although the invention has been described and illustrated in detail, it is to be clearly understood that the same is by way of illustration and example only and is not to be taken by way of limitation, the spirit and scope of this invention being limited only by the terms of the appended claims.

We claim:

1. In a system for calibrating a flow meter, the combination of means for providing a steady driving pressure; tank means for supplying a quantity of liquid under said driving pressure; a retaining vessel; means for maintaining flow at a selected nominal rate from said tank means into said retaining vessel through a flow meter to be calibrated; means operatively associated with said retaining vessel for constantly assuring a substantially smooth liquid surface; and means actuated by the liquid surface for determining and recording the time for a known volume of liquid to be forced into said retaining vessel at the selected nominal rate.

2. In a system for calibrating the rate of flow of liquid through a flow meter, the combination of means for storing a supply of liquid; means for applying a uniform driving pressure to said liquid; a flow meter to be calibrated adapted for the passage therethrough of said liquid; means for selecting a nominal flow rate through said flow meter; standpipe means for collecting liquid from said flow meter being calibrated; means connecting said flow meter to be calibrated between said means for storing a supply of liquid and said standpipe means; means associated with said standpipe means and actuatable by said liquid for energizing time and volume recording means; means operatively associated with said standpipe means for assuring a substantially smooth liquid surface to said last mentioned means; and means associated with said standpipe means responsive to a predetermined accumulation of liquid for deenergizing said time and volume recording means.

3. In a system for calibrating a flow meter, the combination of means for providing transient-free driving pressure; tank means for storing temporarily a quantity of liquid under said driving pressure; a retaining vessel; means for permitting flow from said tank means at selected nominal flow rates through a flow meter to be calibrated into said retaining vessel; means actuated by liquid entering said retaining vessel for energizing recording means; means for smoothing out turbulence of flow into said retaining vessel for assuring a substantially smooth liquid surface; means actuated by the substantially smooth liquid surface of said incoming flow to initiate recording by said recording means; means effective on entry of a predetermined quantity of liquid into said retaining vessel to signal the end of the recording period and the length of time required for entry of the liquid; and means effective on entry of an additional quantity of liquid to de-energize said recording means, to return said liquid to said tank means, and to re-set said system for a subsequent repetition of calibration.

4. In a system for calibrating the rate of flow of liquid through a flow meter, the combination of means for storing a supply of liquid; means for applying a uniform driving pressure to said liquid supply; means for selecting a plurality of nominal flow rates of said liquid through said meter; temporary storage means for retaining the liquid flowing through said meter; flow straightening and smoothing means associated with said storage means for constantly assuring a substantially smooth liquid surface therein; time and volume recording means controllable from probe means associated with said storage means; means, including said liquid being measured, for completing an electrical circuit through said probe means to said recording means; means effective after each filling of said temporary liquid supply storage means for returning said measured liquid to said supply storage means; and means associated with said means for applying uniform driving pressure adapted to pressure-vent said means for storing liquid while returning said measured liquid to said means for storing said supply.

5. The invention of claim 1, wherein said means for constantly assuring a substantially smooth liquid surface is constructed and arranged between the input from said means for selecting the nominal flow permitted, and said retaining vessel, and comprises tangential inlet means for permitting substantially non-turbulent flow into said retaining vessel, a plurality of transversely disposed baffles having flat surfaces disposed parallel to the longitudinal axis of said retaining vessel; and further comprising means for pressure-venting said tank means during operation of said means for returning fluid from said retaining means to said tank.

6. In a system substantially as described in claim 1, wherein said means for constantly assuring a substantially smooth liquid surface comprises means for straightening the flow within said retaining vessel from said tank means and said means for selecting the nominal flow permitted into said retaining vessel, comprising tangential inlet means for permitting flow into said retaining vessel; a plurality of relatively stationary baffles disposed transversely of said retaining vessel and having flat surfaces disposed parallel to the longitudinal axis of said retaining vessel; screen means associated with said baffles; means for returning liquid from said retaining vessel to said tank means a predetermined interval after filling said retaining vessel; and means for reducing the driving pressure in said tank means during the return of liquid thereto.

7. The invention substantially as described in claim 1 wherein the retaining vessel consists of a plurality of sequentially disposed portions of predetermined relatively large diameter and predetermined length, individually smooth constricted portions having a recording probe inserted in each of the constricted portions thereof.

8. In a system substantially as described in claim 1, the combination with a plurality of large diameter storage chambers, each having a gradually tapered constricted section each portion of which has a predetermined radius to length ratio and each having a liquid level probe therein adapted to be actuated by said substantially smooth liquid surface, said constricted portions providing probe-engaging surfaces of said liquid substantially free from variations due to sloshing and changes in viscosity.

9. In a system substantially as described in claim 1, the combination with a plurality of large diameter storage chambers, each two thereof having a gradually tapered constricted section having therebetween a liquid level probe therein, said constricted portions providing probe-engaging surfaces of said liquid substantially free from variations due to sloshing and changes in viscosity, wherein said constricted portions are defined as surfaces of revolution about a Y-axis in the direction of liquid flow therethrough, and as having the radial dimensions and the volume thereof related in accordance with the expression:

$$y = -\frac{Ct_0}{\pi^2(b^2-a^2)}\left[\frac{\sqrt{a^2-(x-b)^2}}{x} + \frac{b}{\sqrt{b^2-a^2}}\arcsin\left(\frac{bx+a^2-b^2}{ax}\right)\right] + \frac{Ct_0 b}{\pi(b^2-a^2)^{3/2}}$$

where $y$ = dimension along the axis of flow;
$x$ = the radius of the constriction at any position $y$ along its length;
$Ct_0$ = the volume of the constricted portion of the vessel;
$C$ = flow rate;
$t_0$ = time;
$b+a$ = the radius of the vessel at the entrance to the constriction; and
$b-a$ = the radius of the vessel at the exit of the constriction.

10. In a system for calibrating a flowmeter, the combination of: fluid storage means, means adapted to pressurize fluid in said storage means at a predetermined pressure, a flowmeter to be calibrated, means to supply fluid from said storage means to said flowmeter, means to control the flow through said flowmeter at a preselected nominal rate, fluid retaining means adapted to receive fluid from said meter, time and volume recording means associated with said retaining means responsive to the liquid level surface and means responsive to a predetermined volume of fluid within said retaining means to return fluid to said storage means.

References Cited in the file of this patent

UNITED STATES PATENTS

| | | |
|---|---|---|
| 820,429 | May | May 15, 1906 |
| 2,050,800 | Lane et al. | Aug. 11, 1936 |
| 2,230,137 | Ewertz | Jan. 28, 1941 |
| 2,705,972 | Vawter | Apr. 12, 1955 |
| 2,710,537 | Schuler et al. | June 14, 1955 |
| 2,755,663 | Smith et al. | July 24, 1956 |
| 2,772,561 | Plank et al. | Dec. 4, 1956 |
| 2,778,218 | Sault | Jan. 22, 1957 |